United States Patent
Wei

(10) Patent No.: US 8,341,684 B2
(45) Date of Patent: Dec. 25, 2012

(54) METHOD AND DEVICE FOR TRANSMITTING DATA

(75) Inventor: Xiaoxia Wei, Shenzhen (CN)

(73) Assignee: Huawei Device Co., Ltd., Shenzhen, Guangdong (CN)

( * ) Notice: Subject to any disclaimer, the term of this patent is extended or adjusted under 35 U.S.C. 154(b) by 129 days.

(21) Appl. No.: 13/036,424

(22) Filed: Feb. 28, 2011

(65) Prior Publication Data

US 2011/0154427 A1 Jun. 23, 2011

Related U.S. Application Data

(63) Continuation of application No. PCT/CN2009/072746, filed on Jul. 13, 2009.

(30) Foreign Application Priority Data

Aug. 29, 2008 (CN) .......................... 2008 1 0141772

(51) Int. Cl.
*H04N 7/16* (2011.01)
*H04N 7/173* (2011.01)

(52) U.S. Cl. ......................................... 725/118; 725/62
(58) Field of Classification Search ..................... 725/62, 725/118
See application file for complete search history.

(56) References Cited

U.S. PATENT DOCUMENTS

| 6,014,694 | A | 1/2000 | Aharoni et al. | |
| 7,317,685 | B1 | 1/2008 | Flott et al. | |
| 8,010,139 | B2* | 8/2011 | Yu et al. | 455/509 |
| 8,243,117 | B2* | 8/2012 | Ali et al. | 348/14.01 |
| 2002/0019967 | A1 | 2/2002 | Bonifas | |
| 2005/0232151 | A1 | 10/2005 | Chapweske | |
| 2007/0086485 | A1 | 4/2007 | Vega-Garcia et al. | |
| 2008/0134005 | A1 | 6/2008 | Izzat et al. | |
| 2009/0158358 | A1* | 6/2009 | Yu et al. | 725/62 |

FOREIGN PATENT DOCUMENTS

| CN | 1486076 A | 3/2004 |
| CN | 1540954 | 10/2004 |
| CN | 1627843 A | 6/2005 |

(Continued)

OTHER PUBLICATIONS

Extended European Search Report issued in related EP 09809202.6 dated Oct. 21, 2011.

(Continued)

*Primary Examiner* — Kieu Oanh T Bui
(74) *Attorney, Agent, or Firm* — Finnegan, Henderson, Farabow, Garrett & Dunner, LLP

(57) ABSTRACT

A method for transmitting video communication data includes: allocating a redundant audio data bandwidth according to an obtained current packet loss ratio of audio data, generating redundant audio data according to the redundant audio data bandwidth, and sending the redundant audio data; calculating a target total video data bandwidth according to a video communication bandwidth, an encoded audio data bandwidth, and the redundant audio data bandwidth; allocating a redundant video data bandwidth according to an obtained current packet loss ratio of video data and the target total video data bandwidth, generating redundant video data according to the redundant video data bandwidth, and sending the redundant video data. A method for transmitting video communication data and a video communication device are also provided. By using the method and device, the quality of voices and videos is improved in the video communication, and the utilization efficiency of the communication bandwidth is guaranteed.

17 Claims, 3 Drawing Sheets

FOREIGN PATENT DOCUMENTS

| | | |
|---|---|---|
| CN | 1741435 A | 3/2006 |
| CN | 1855793 A | 11/2006 |
| CN | 101047845 | 10/2007 |
| CN | 101061659 A | 10/2007 |
| WO | WO2006060036 A1 | 6/2006 |
| WO | WO2010/022617 A1 | 3/2010 |

OTHER PUBLICATIONS

Written Opinion of the International Search Authority issued in related PCT/CN2009/072746 dated Oct. 22, 2009.

Li, Yongjun; "A Dynamic Bit Rate Allocation Model for IP Based Videoconference Systems," Sep. 28, 2003.

International Search Report for International Application No. PCT/CN2009/072746, mailed Oct. 22, 2009 Huawei Technologies Co., Ltd.

First Chinese Office Action dated (mailed) Dec. 16, 2011, issued in related Chinese Application No. 200810141772.1 Huawei Technologies Co., Ltd.

Qiang, Ma; "Study on Network Adaptable Techniques for Video Conferencing Systems"; A Master Thesis in Computer Application Technology; Northern University; Dec. 2004 (73 pgs.).

Zhang, Yang; "The Research of Adaptive Network Transmission Control Technology and the Application in Video Conferencing System"; Master's Degree Dissertation—Automation College of Chongqing University; May 2002 (60 pgs.).

Rejection Decision (Partial Translation) of Chinese Patent Application No. 200810141772.1; dated (mailed) Jun. 5, 2012 for Huawei Terminal Co., Ltd., filed Aug. 29, 2008 (19 pgs.).

* cited by examiner

METHOD AND DEVICE FOR TRANSMITTING DATA

CROSS-REFERENCE TO RELATED APPLICATIONS

This application is a continuation of International Application No. PCT/CN2009/072746, filed on 13 Jul. 2009, which claims priority to Chinese Patent Application No. 200810141772.1, filed on 29 Aug. 2008, both of which are hereby incorporated by reference in their entireties.

FIELD OF THE INVENTION

The present invention relates to the communication field, and in particular, to a method and a device for transmitting data in a video communication system.

BACKGROUND

A video communication system based on an Internet Protocol (IP) network encapsulates the audio data and video data over the Real-time Transport Protocol (RTP), and generates audio and video RTP packets. The video communication system generally transmits the audio and video RTP packets over the User Datagram Protocol (UDP) at the transport layer. UDP is an unreliable transmission protocol. It does not ensure that the data can reach the destination after the data is sent to the network.

When congestion occurs on the network, the data packets transmitted on the network may be discarded. Because the audio data and video data are transmitted over the unreliable UDP protocol, the audio data and video data may get lost in the case of packet losses on the network. When some audio data and video data are lost, the quality of voices and images decoded and reproduced by the receiving terminal may be affected. When the packet loss ratio is low, the sound reproduced by the receiving terminal may be discontinuous, and the reproduced image may be erratic. When the packet loss ratio is high, the sound reproduced at the receiving terminal may be unclear, and the reproduced image may be seriously erratic and cannot be watched.

In the prior art, a data recovery method is used to reduce the negative impact that the packet loss has on the quality of sound and video in video communication communication. That is, error resilience is performed on the video data in the video communication system; the video data to be transmitted is processed, and associated redundant data is generated; the video data and associated redundant video data are transmitted to the receiving terminal through the network. In this way, when packet losses occur on the network, the receiving terminal may restore the lost data packets with a certain probability according to the received video data and redundant data.

In the current video communication systems, after the communication is established, the video communication bandwidth, encoded audio data bandwidth, and encoded video data bandwidth are determined, and cannot be changed in the communication process. For example, to hold a video conference with a bandwidth of 768 Kbps, the compression coding is performed on the audio over the G.711 protocol after the negotiation. In this case, the audio data may occupy a bandwidth of 64 Kbps. If there are no requirements for transmitting other specific data (for example, a data conference) during the conference, the remaining bandwidth is used to transmit video data. In this case, the bandwidth for the video data is 704 Kbps (=768−64). Thus, the audio data may occupy a data bandwidth of 64 Kbps, and the video data may maximally occupy a data bandwidth of 704 Kbps. When there are packet losses on the network, to guarantee the video image quality of the receiving terminal, the data recovery technology may be used to protect the video data. That is, the video data to be transmitted is processed, and associated redundant data is generated; the video data and associated redundant video data are transmitted to the receiving terminal through the network. In this way, when packet losses occur on the network, the receiving terminal may restore the lost data packets with a certain probability according to the received video data and redundant data. When packet losses occur on the network, the audio data in the communication may be discarded. Because some audio data is discarded, when the received audio data is decoded and reproduced, the sound may have problems such as stop, discontinuity, and unclearness. The data recovery technology can only perform error resilience on the video data, and cannot restore the lost packets of the audio data, thus failing to bring a better experience to users.

SUMMARY OF THE INVENTION

Embodiments of the present invention provide a method and a device for transmitting data to overcome the voice and image quality deterioration caused by packet losses in video communication systems. To solve the above technical problem, an embodiment of the present invention provides a method for transmitting video communication data, where the method includes:

allocating a redundant audio data bandwidth according to an obtained current packet loss ratio of audio data, generating redundant audio data according to the redundant audio data bandwidth, and sending the redundant audio data;

calculating a target total video data bandwidth according to the video communication bandwidth, encoded audio data bandwidth, and the redundant audio data bandwidth; and allocating a redundant video data bandwidth according to an obtained current packet loss ratio of video data and the target total video data bandwidth, generating redundant video data according to the redundant video data bandwidth, and sending the redundant video data.

An embodiment of the present invention provides another method for transmitting video communication data, where the method includes:

allocating a redundant video data bandwidth according to an obtained current packet loss ratio of video data, generating redundant video data according to the redundant video data bandwidth, and sending the redundant video data;

calculating a target total audio data bandwidth according to the video communication bandwidth, encoded video data bandwidth, and the redundant video data bandwidth; and allocating a redundant audio data bandwidth according to an obtained current packet loss ratio of audio data and the target total audio data bandwidth, generating redundant audio data according to the redundant audio data bandwidth, and sending the redundant audio data.

An embodiment of the present invention provides a video communication device, where the device includes a data transceiver module and further includes:

a bandwidth allocating module, configured to: obtain packet loss ratios of audio data and video data, and allocate redundant data bandwidths to the audio data and video data according to the obtained packet loss ratios of the audio data and video data;

an audio data error resilience module, configured to: generate redundant audio data for error resilience according to the redundant audio data bandwidth allocated by the bandwidth allocating module, and send the audio data and redundant audio data to the data transceiver module; and a video data error resilience module, configured to: generate redundant video data for error resilience according to the redundant video data bandwidth allocated by the bandwidth allocating module, and send the video data and redundant video data to the data transceiver module.

It can be seen from the above technical solution that, according to embodiments of the present invention, a certain bandwidth is allocated from the video communication bandwidth and used to perform error resilience on the audio data and video data. In this way, the video communication system can make full use of limited video communication bandwidth resources, thus improving the quality of voices and images in video communication systems.

BRIEF DESCRIPTION OF THE DRAWINGS

To make the technical solution under the present invention clearer, the following outlines the accompanying drawings involved in the description of the embodiments of the present invention. Apparently, the accompanying drawings outlined below are exemplary only and not exhaustive, and persons of ordinary skill in the art can derive other drawings from such accompanying drawings without any creative effort.

DETAILED DESCRIPTION OF THE INVENTION

The technical solution under the present invention is described in detail below with reference to the accompanying drawings. Apparently, the embodiments described below are exemplary only, without covering all embodiments of the present invention. Persons having ordinary skill in the art can derive other embodiments from the embodiments given herein without any creative effort, and all such embodiments are covered in the scope of the present invention.

A method and a device for transmitting video communication data are provided in embodiments of the present invention.

In embodiments of the present invention, when packet losses occur on a network, some bandwidths are allocated from the video communication bandwidth and used to perform error resilience on the audio data and video data; the bandwidth for transmitting data for error resilience is calculated in adaptive mode according to the packet loss ratios of the audio data and video data, video communication bandwidth, encoded audio data bandwidth, and encoded video data bandwidth. In this way, the subjective effects of the voice and image in video communication systems are improved in the case of packet losses on the network.

The following describes the embodiments of the present invention with reference to the accompanying drawings.

Figure 1:
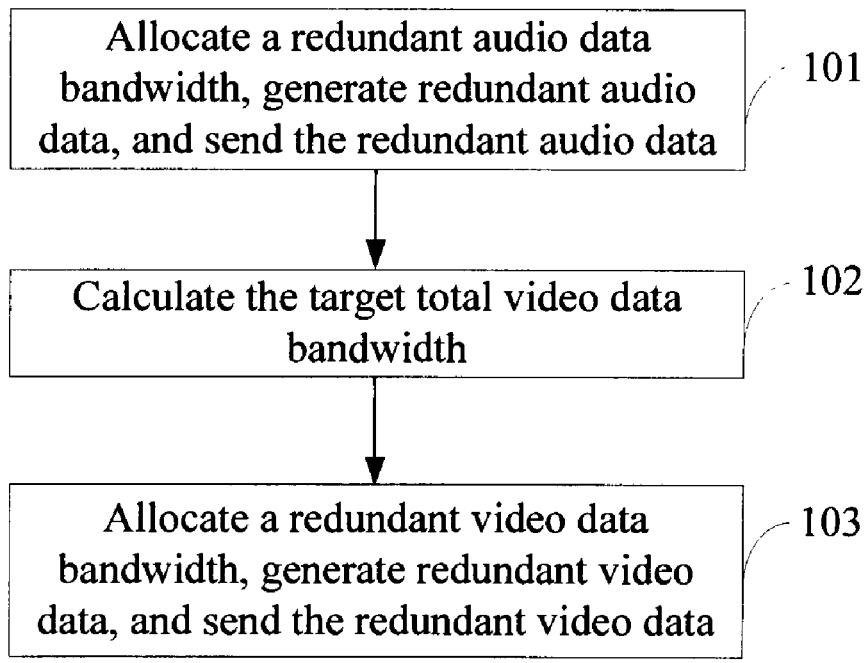
FIG. 1 is a flowchart of a method according to a first embodiment of the present invention.

FIG. 1 is a flowchart of a method according to a first embodiment of the present invention. In this embodiment, a redundant data bandwidth is allocated preferentially to audio data to guarantee the audio quality preferentially.

Step 101: Allocate a redundant audio data bandwidth, generate redundant audio data, and send the redundant audio data.

The redundant audio data bandwidth is allocated according to an obtained current packet loss ratio of audio data; the redundant audio data is generated according to the redundant audio data bandwidth; and the redundant audio data is sent.

Step 102: Calculate a target total video data bandwidth.

The target total video data bandwidth is calculated according to the video communication bandwidth, encoded audio data bandwidth, and the redundant audio data bandwidth.

Step 103: Allocate a redundant video data bandwidth, generate redundant video data, and send the redundant video data.

The redundant video data bandwidth is allocated according to the obtained current packet loss ratio of video data and the target total video data bandwidth; the redundant video data is generated according to the redundant video data bandwidth; and the redundant video data is sent.

Figure 2:
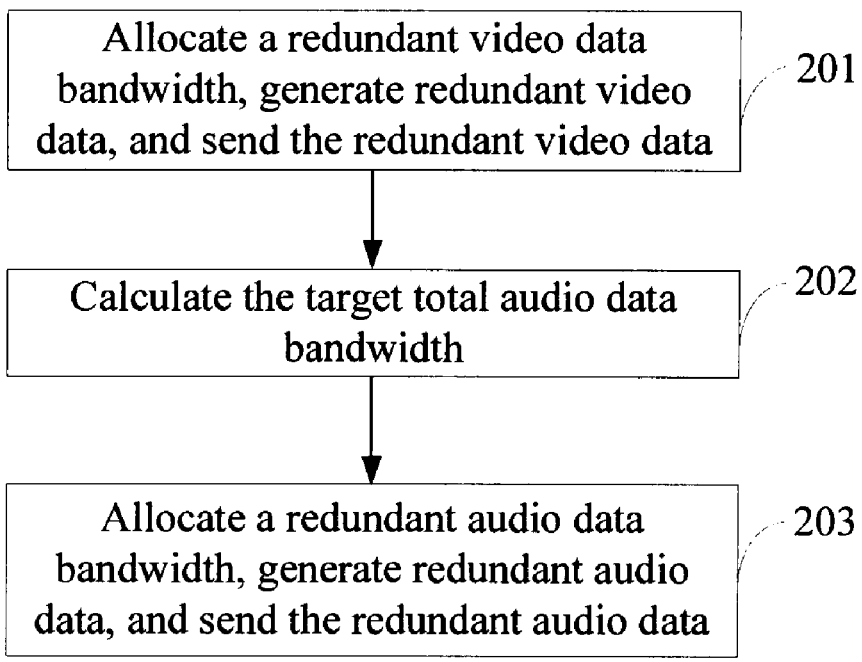
FIG. 2 is a flowchart of a method according to a second embodiment of the present invention.

FIG. 2 is a flowchart of a method according to the second embodiment of the present invention. In the second embodiment, a redundant data bandwidth is allocated preferentially to video data to guarantee the video quality preferentially.

Step 201: Allocate a redundant video data bandwidth, generate redundant video data, and send the redundant video data.

The redundant video data bandwidth is allocated according to an obtained current packet loss ratio of video data; the redundant video data is generated according to the redundant video data bandwidth; and the redundant video data is sent.

Step 202: Calculate a target total audio data bandwidth.

The target total audio data bandwidth is calculated according to the video communication bandwidth, encoded video data bandwidth, and the redundant video data bandwidth.

Step 203: Allocate a redundant audio data bandwidth, generate redundant audio data, and send the redundant audio data.

The redundant audio data bandwidth is allocated according to the obtained current packet loss ratio of audio data and the target total audio data bandwidth; the redundant audio data is generated according to the redundant audio data bandwidth; and the redundant audio data is sent.

Figure 3:
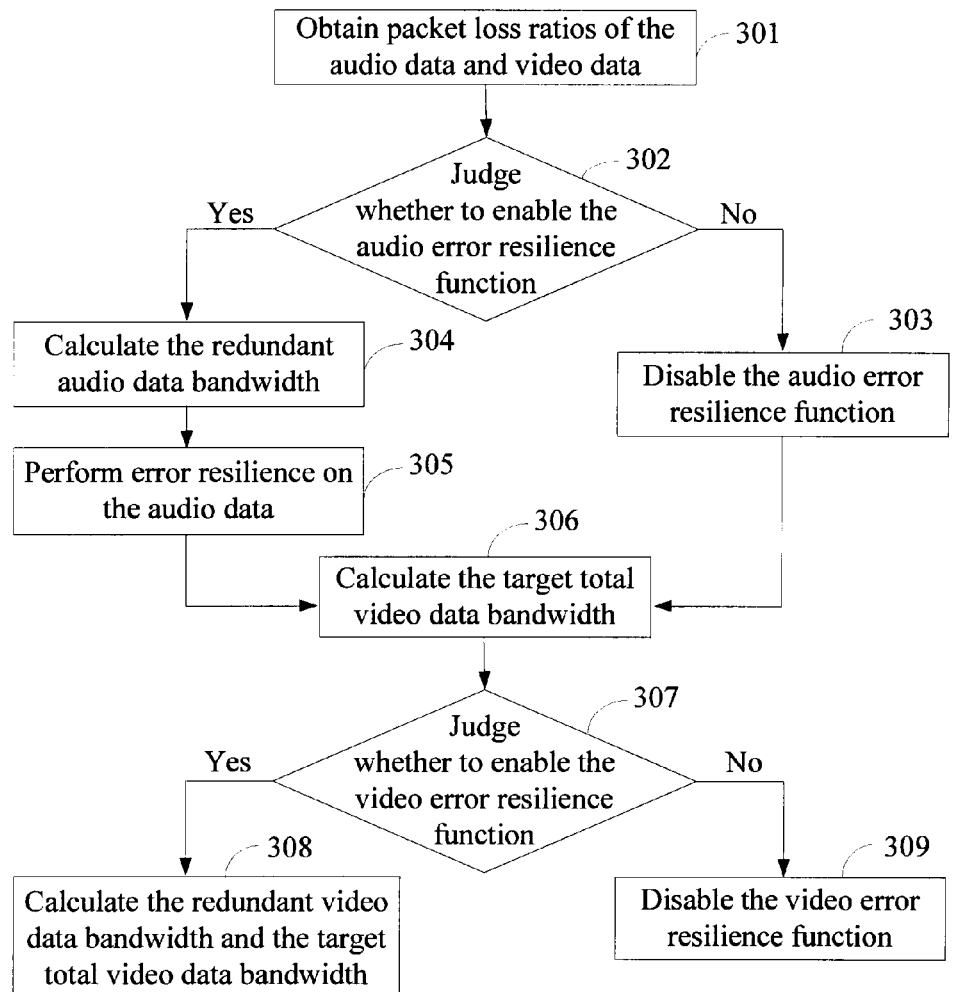
FIG. 3 is a flowchart of allocating a redundant data bandwidth to audio data preferentially by a video communication system according to an embodiment of the present invention.

FIG. 3 illustrates a process of allocating a redundant audio data bandwidth to audio data preferentially by a video communication system according to an embodiment of the present invention.

After a communication is established, supposing the video communication bandwidth is used only for transmitting audio data and video data, the video communication bandwidth is represented by BandC, the encoded audio data bandwidth is represented by BandA, and the encoded video data bandwidth is represented by BandV. In this case, BandC=BandA+BandV.

Step 301: Obtain the packet loss ratios of the audio data and video data.

Generally, after the communication is established, a video communication device may receive packet loss ratios of the audio data and video data sent from a remote video communication device periodically.

Step 302: Judge whether to enable the audio error resilience function.

The following process may be triggered each time when the video communication device receives the packet loss ratios of the audio data and video data from a remote device:

Obtain the information about enabling or disabling the audio data error resilience function according to the obtained current packet loss ratio of the audio data or according to the current video communication bandwidth, current audio encoding protocol type, and current video encoding protocol type. For example, judge the packet loss ratio of the audio data; if the packet loss ratio is greater than threshold K1 (for example, 3%), step 304 is performed; if the packet loss ratio is equal to or lower than threshold K1, step 303 is performed.

The video communication device may determine to enable or disable the audio data error resilience function according to multiple audio packet loss ratios or according to the audio packet loss ratio within a certain time. The number of times and duration may be set as required. The above audio data error resilience function is enabled or disabled by the video communication device in adaptive mode according to the audio packet loss ratio. The audio data error resilience function may also be enabled or disabled according to manual settings or according to the packet loss ratio and manual settings.

Step 303: Disable the audio error resilience function.

If it is determined that the audio data error resilience function is not enabled, the video communication device may not perform error resilience on the audio data. If the audio data error resilience function is already enabled, the video communication device disables the audio data error resilience function. Then, the process proceeds to step 306.

Step 304: Calculate the redundant audio data bandwidth.

If it is determined that the audio data error resilience function is enabled, the video communication device determines that the redundant audio data bandwidth is BandDeltaA, where the BandDeltaA<BandC−BandA. The BandDeltaA may be a fixed value, for example, 5% of the video communication bandwidth. The BandDeltaA may also vary with the packet loss ratio of the audio data. For example, the packet loss ratio of the audio data is associated with the BandDeltaA to form a mapping table; the packet loss ratio of the audio data within an interval corresponds to the BandDeltaA. In another example, a calculation formula is designed to associate the packet loss ratio of the audio data with the BandDeltaA, for example, BandDeltaA=A×LostRateAudio+B. In this formula, BandDeltaA denotes the redundant audio data bandwidth, LostRateAudio denotes the packet loss ratio of the audio data, and A and B are constants used to adjust the relationship between the redundant audio data bandwidth and the packet loss ratio of the audio data. In another example, a policy is designed according to the packet loss ratio of the audio data, video communication bandwidth, encoded audio data bandwidth, and encoded video data bandwidth so as to obtain the BandDeltaA under various conditions.

Step 305: Perform error resilience on the audio data.

The audio data error resilience function is enabled to perform error resilience on the audio data; the redundant audio data for error resilience is generated according to the redundant audio data bandwidth, and the audio data and redundant audio data are sent to the network in certain sequence. A lot of methods are available for generating redundant audio data. For example, a parity check code is used to generate redundant data. The basic principle of this method is as follows: Every K information packets are added to a parity check packet; the data of the parity check packet consists of check bits in the K information packets. In another example, an RS code (a linear code with powerful error correction abilities proposed by Reed and Solomon in 1960) is used to generate redundant data. In another example, a Tornado code (an erasure code co-designed by Luby, Mitzenmacher, and Shokrollahi) may be used to generate redundant data. These available methods for generating redundant audio data are based on the prior art, and are not further described here.

Step 306: Calculate the target total video data bandwidth.

After the audio data error resilience function is enabled or disabled, the target total video data (including video data and possible redundant video data) bandwidth is recalculated. When the audio data and video data in the communication occupy the communication bandwidth completely, the target total video data bandwidth is calculated by the following formula after the audio error resilience function is enabled: TotalBandV=BandC−BandA−BandDeltaA; the target total video data bandwidth is calculated by the following formula after the audio error resilience function is disabled: TotalBandV=BandC−BandA.

Step 307: Judge whether to enable the video error resilience function.

The video data error resilience function may be enabled or disabled according to the obtained packet loss ratio of the video data or according to the current video communication bandwidth, target total video data bandwidth TotalBandV, current audio encoding protocol type, and current video encoding protocol type. For example, the judgment may be made only according to the packet loss ratio of the video data. When the packet loss ratio of the video data is greater than threshold K2 (for example, K2 is equal to 1%), the process proceeds to step 308; when the packet loss ratio of the video data is equal to or lower than threshold, the process proceeds to step 309. In another example, a comprehensive policy is designed according to the video packet loss ratio, video communication bandwidth, current target total video data bandwidth, current audio encoding protocol type, and video encoding protocol type so as to determine whether to enable the video data error resilience function.

Similarly, the video communication device may determine to enable or disable the video data error resilience function according to multiple audio packet loss ratios or according to the audio packet loss ratio within a certain time. The number of times and duration may be set as required.

Step 308: Calculate the redundant video data bandwidth and the target total video data bandwidth.

If it is determined that the video data error resilience function is enabled, the video communication device determines that the redundant video data bandwidth is BandDeltaV, where the BandDeltaV is smaller than the TotalBandV. The BandDeltaV may be a fixed value, for example, 5% of the video communication bandwidth. The BandDeltaV may also vary with the packet loss ratio of the video data. For example, the packet loss ratio of the video data is associated with the BandDeltaV to form a mapping table; the packet loss ratio of the video data within an interval corresponds to the BandDeltaV. In another example, a calculation formula is designed to associate the packet loss ratio of the video data with the BandDeltaV, for example, BandDeltaV=A×LostRateVideo+B. In this formula, BandDeltaV denotes the redundant video data bandwidth, LostRateVideo denotes the packet loss ratio of the video data, and A and B are constants used to adjust the relationship between the redundant video data bandwidth and the packet loss ratio of the video data. In another example, a policy is designed according to the packet loss ratio of the video data, video communication bandwidth, encoded audio data bandwidth, and encoded video data bandwidth so as to obtain the BandDeltaV under various conditions. In addition, a new target encoded video data bandwidth is calculated as follows: newBandV=TotalBandV−BandDeltaV. The video data error resilience function is enabled to perform error resilience on the video data; the redundant video data is generated according to the redundant video data bandwidth, and the video data and redundant video data are sent to the network in certain sequence.

Step 309: Disable the video error resilience function.

If it is determined that the video data error resilience function is not enabled, the video communication device may not perform error resilience on the video data. If the video data error resilience function is already enabled, the video communication device disables the video data error resilience function.

In the above process, to avoid frequently enabling or disabling the audio and video data error resilience function and frequently changing the bandwidth occupied by the redundant audio and video data, the process may be implemented at a long interval. Within this interval, statistics and analysis are performed on the received packet loss ratios of the audio data and video data. For example, the frequency at which the packet loss ratio is greater than a threshold and the mean value of the packet loss ratios are calculated; a judgment is made to determine whether to enable the audio data or video data error resilience function and whether to change the current redundant audio/video data bandwidth according to these calculated values.

What has been described is the method provided in embodiments of the present invention, supposing the redundant audio data bandwidth is preferentially allocated to guarantee the audio quality. In practical applications, the redundant video data bandwidth may also be preferentially allocated as required to guarantee the video quality. The process is similar to that of allocating a redundant audio data bandwidth to the audio data, and is not further described.

Figure 4:
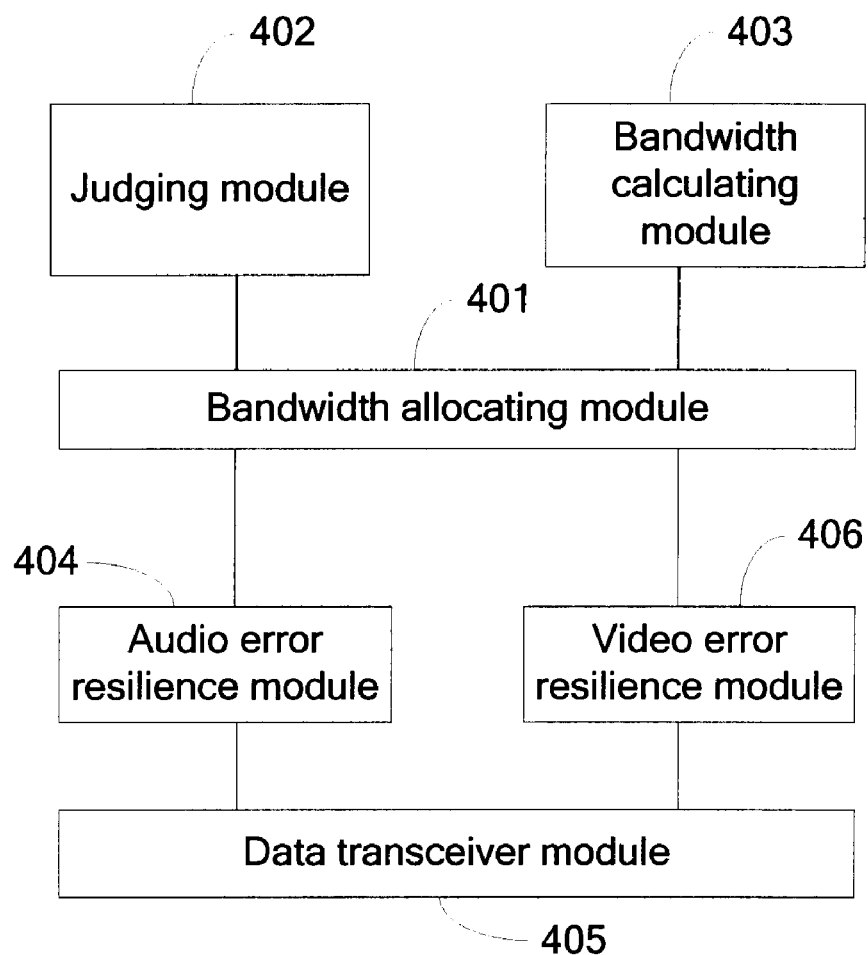
FIG. 4 illustrates a device according to an embodiment of the present invention.

FIG. 4 illustrates a device in an embodiment of the present invention. The following describes the device supposing a redundant data bandwidth is preferentially allocated to the audio data.

After the communication is established, the bandwidth allocating module 401 records the video communication bandwidth BandC, encoded audio data bandwidth BandA, and encoded video data bandwidth BandV. In this case, the redundant audio data bandwidth BandDeltaA may be set to 0, and the error resilience is not performed on the audio data; the redundant video data bandwidth BandDeltaV may be set to 0, and the error resilience is not performed on the video data. Supposing no other data transmission needs to occupy the bandwidth in the communication, BandC=BandA+BandV.

After the bandwidth allocating module 401 receives the packet loss ratio of the audio data sent from a remote video communication device, the judging module 402 compares the packet loss ratio of the audio data with a preset threshold; if the packet loss ratio of the audio data is greater than the preset threshold, the judging module 402 notifies the bandwidth allocating module 401 of allocating a redundant audio data bandwidth for transmitting redundant audio data; if the packet loss ratio of the audio data is equal to or lower than the preset threshold, the judging module 402 does not allocate the redundant audio data bandwidth. The judging module 402 may also judge whether to allocate a redundant data bandwidth to the audio data according to the current packet loss ratio of the audio data, current communication bandwidth, current audio encoding protocol type, and current video encoding protocol type.

The bandwidth allocating module 401 may also measure multiple packet loss ratios of the audio data received within a certain time (for example, one minute), and obtain the packet loss information of the audio data within the time, for example, the mean packet loss ratio and frequency at which the packet loss ratio is greater than a threshold. By using the packet loss information, the judging module 402 judges whether to enable the audio data error resilience function and determines the redundant audio data bandwidth according to the current communication bandwidth, current audio encoding protocol type, and current video encoding protocol type. To avoid enabling or disabling the audio error resilience function frequently and adjusting the bandwidth occupied by the redundant audio data frequently, it is suggested to use the measured packet loss information of the audio data with the error resilience, and to adjust the state of the error resilience function and the bandwidth occupied by the redundant data once within a long time. The adjustment process may be triggered cyclically by a timer. The adjustment of the audio data bandwidth and the video data bandwidth may be triggered on a synchronous basis or on an asynchronous basis. The adjustment process may also be triggered by trigger conditions that are generated by using the packet loss ratio, communication bandwidth, audio encoding protocol type, and current video encoding protocol type. The adjustment process may also be triggered manually.

If the judging module 402 determines that the redundant audio data bandwidth needs to be allocated, the bandwidth calculating module 403 calculates the redundant audio data bandwidth according to the packet loss ratio of the audio data obtained by the bandwidth allocating module 401 or according to the current packet loss ratio of the audio data, current encoded audio data bandwidth, and current encoded video data bandwidth. For example, the packet loss ratio of the audio data may be associated with the BandDeltaA to form a mapping table in which the packet loss ratio of the audio data within an interval corresponds to the BandDeltaA. In another example, a calculation formula is designed to associate the packet loss ratio of the audio data with the BandDeltaA, for example, BandDeltaA=A×LostRateAudio+B. In this formula, BandDeltaA denotes the redundant audio data bandwidth, LostRateAudio denotes the packet loss ratio of the audio data, and A and B are constants used to adjust the relationship between the redundant audio data bandwidth and the packet loss ratio of the audio data. In another example, a policy is designed according to the packet loss ratio of the audio data, video communication bandwidth, encoded audio data bandwidth, and encoded video data bandwidth so as to obtain the BandDeltaA under various conditions. If the bandwidth allocating module 401 receives a notification that the redundant data bandwidth is not allocated, the bandwidth allocating module 401 does not allocate any redundant data bandwidth to the audio data.

The audio error resilience module 404 performs error resilience on the audio data, generates redundant audio data according to the redundant audio data allocated by the bandwidth allocating module 401, and sends the redundant audio data to the data transceiver module 405.

After the redundant data bandwidth is allocated to the audio data, the bandwidth calculating module 403 recalculates the target total video data (video stream data and possible redundant video data) bandwidth. If the audio data and video data in the communication occupy the communication bandwidth completely, the target total video data bandwidth is as follows: TotalBandV=BandC−BandA−BandDeltaA. If the bandwidth allocating module 401 does not allocate a redundant data bandwidth to the audio data, BandDeltaA=0.

The judging module 402 judges whether to allocate a redundant data bandwidth to the video data according to the packet loss ratio of the video data obtained by the bandwidth allocating module 401 in combination with the current video communication bandwidth, TotalBandV, current audio encoding protocol type, and current video encoding protocol type. This process is similar to that of judging whether to allocate a redundant data bandwidth to the audio data and calculating the redundant audio data bandwidth, and is not further described.

After the redundant data bandwidth is allocated to the video data, the new target encoded video data bandwidth is as follows: newBandV=TotalBandV−BandDeltaV.

The video data error resilience module 406 performs error resilience on the video data according to the redundant video data bandwidth allocated by the bandwidth allocating module 401, generates redundant video data, and sends the redundant audio data to the data transceiver module 405.

What has been described is the device provided in embodiments of the present invention supposing the redundant data bandwidth is preferentially allocated to the audio data. In practical applications, the redundant data bandwidth may also be preferentially allocated to the video data. The process is similar to that of allocating the redundant data bandwidth to the audio data, and is not further described.

In embodiments of the present invention, a certain bandwidth is allocated from the video communication bandwidth and used to perform error resilience on the audio data. In this way, the video communication system can make full use of limited video communication bandwidth resources, thus improving the quality of voices and images in video communication systems. If no packet losses occur during the network transmission, the audio and video error resilience functions can be disabled in adaptive mode so as to ensure the optimal quality of voices and images on normal networks.

It should be noted that the above embodiments are merely some exemplary embodiments of the present invention, but not intended to limit the present invention. Although the present invention has been described in detail with reference to the foregoing embodiments, it is apparent that those skilled in the art can make various modifications and variations to the technical solution described in the above embodiments or may make equivalent replacements to some of the technical features of the technical solution without departing from the spirit and scope of the embodiments of the invention.

It is understandable to those skilled in the art that all or some of the steps in the preceding embodiments may be implemented by related hardware instructed by a program. The program may be stored in a computer readable storage medium. When the program is executed, the processes of the preceding methods are executed. The preceding storage medium may be a magnetic disk, a compact disk-read only memory (CD-ROM), a read only memory (ROM), or a random access memory (RAM).

What is claimed is:

1. A method for transmitting video communication data, comprising:
    allocating a redundant audio data bandwidth according to an obtained current packet loss ratio of audio data, generating redundant audio data according to the redundant audio data bandwidth, and sending the redundant audio data;
    calculating a target total video data bandwidth according to a video communication bandwidth, an encoded audio data bandwidth, and the redundant audio data bandwidth; and
    allocating a redundant video data bandwidth according to an obtained current packet loss ratio of video data and the target total video data bandwidth, generating redundant video data according to the redundant video data bandwidth, and sending the redundant video data.

2. The method of claim 1, wherein:
    before allocating the redundant audio data bandwidth according to the obtained current packet loss ratio of the audio data, the method further comprises: judging whether to allocate the redundant audio data bandwidth for transmitting the redundant audio data according to the current packet loss ratio of the audio data or according to the current packet loss ratio of the audio data, video communication bandwidth, encoded audio data bandwidth, and encoded video data bandwidth; and
    before allocating the redundant video data bandwidth according to the obtained current packet loss ratio of the video data and the target total video data bandwidth, the method further comprises: judging whether to allocate the redundant video data bandwidth for transmitting the redundant video data according to the current packet loss ratio of the video data or according to the current packet loss ratio of the video data, video communication bandwidth, encoded audio data bandwidth, redundant audio data bandwidth, and encoded video data bandwidth.

3. The method of claim 2, wherein:
    judging whether to allocate the redundant audio data bandwidth for transmitting the redundant audio data according to the current packet loss ratio of the audio data comprises: comparing the current packet loss ratio of the audio data with a preset threshold; if the current packet loss ratio of the audio data is greater than the threshold, allocating the redundant audio data bandwidth for transmitting the redundant audio data; and
    judging whether to allocate the redundant video data bandwidth for transmitting the redundant video data according to the current packet loss ratio of the video data comprises: comparing the current packet loss ratio of the video data with a preset threshold; if the current packet loss ratio of the video data is greater than the threshold, allocating the redundant video data bandwidth for transmitting the redundant video data.

4. The method of claim 1, wherein:
    the obtained current packet loss ratio of the audio data is one packet loss ratio of the audio data or a comprehensive value of multiple packet loss ratios of the audio data, or a packet loss ratio of the audio data within a certain period of time; and
    the obtained current packet loss ratio of the video data is one packet loss ratio of the video data or a comprehensive value of multiple packet loss ratios of the video data, or a packet loss ratio of the video data within a certain period of time.

5. The method of claim 1, wherein:
    allocating the redundant audio data bandwidth according to the obtained current packet loss ratio of the audio data comprises: presetting a fixed bandwidth; after obtaining the current packet loss ratio of the audio data, using the preset fixed bandwidth as the redundant audio data bandwidth; and
    allocating the redundant video data bandwidth according to the obtained current packet loss ratio of the video data and the target total video data bandwidth comprises: presetting a fixed bandwidth; after obtaining the current packet loss ratio of the video data, using the preset fixed bandwidth as the redundant video data bandwidth, wherein the target total video data bandwidth is greater than the redundant video data bandwidth.

6. The method of claim 1, wherein:
    allocating the redundant audio data bandwidth according to the obtained current packet loss ratio of the audio data comprises: presetting a mapping table between the packet loss ratio of the audio data and the redundant audio data bandwidth; after obtaining the current packet loss ratio of the audio data, querying the mapping table, and obtaining the redundant audio data bandwidth corresponding to the current packet loss ratio of the audio data; and allocating the redundant video data bandwidth according to the obtained current packet loss ratio of the video data and the target total video data bandwidth comprises: presetting a mapping table between the packet loss ratio of the video data and the redundant video data bandwidth; after obtaining the current packet loss ratio of the video data, querying the mapping table, and obtaining the redundant video data bandwidth corresponding to the current packet loss ratio of the video data, wherein the target total video data bandwidth is greater than the redundant video data bandwidth.

7. The method of claim 1, wherein:

allocating the redundant audio data bandwidth according to the obtained current packet loss ratio of the audio data comprises: designing a formula to associate the redundant audio data bandwidth with the packet loss ratio of the audio data, and calculating the redundant audio data bandwidth according to the packet loss ratio of the audio data; and allocating the redundant video data bandwidth according to the obtained current packet loss ratio of video data and the target total video data bandwidth comprises: designing a formula to associate the redundant video data bandwidth with the packet loss ratio of the video data, and calculating the redundant video data bandwidth according to the packet loss ratio of the video data, wherein the target total video data bandwidth is greater than the redundant video data bandwidth.

8. A method for transmitting video communication data, comprising:

allocating a redundant video data bandwidth according to an obtained current packet loss ratio of video data, generating redundant video data according to the redundant video data bandwidth, and sending the redundant video data;

calculating a target total audio data bandwidth according to a video communication bandwidth, an encoded video data bandwidth, and the redundant video data bandwidth; and allocating a redundant audio data bandwidth according to an obtained current packet loss ratio of audio data and the target total audio data bandwidth, generating redundant audio data according to the redundant audio data bandwidth, and sending the redundant audio data.

9. The method of claim 8, wherein:

before allocating the redundant video data bandwidth according to the obtained current packet loss ratio of the video data, the method further comprises: judging whether to allocate the redundant video data bandwidth for transmitting the redundant video data according to the current packet loss ratio of the video data or according to the current packet loss ratio of the video data, video communication bandwidth, encoded video data bandwidth, and encoded audio data bandwidth; and before allocating the redundant audio data bandwidth according to the obtained current packet loss ratio of the audio data and the target total audio data bandwidth, the method further comprises: judging whether to allocate the redundant audio data bandwidth for transmitting the redundant audio data according to the current packet loss ratio of the audio data or according to the current packet loss ratio of the audio data, video communication bandwidth, encoded video data bandwidth, redundant video data bandwidth, and encoded audio data bandwidth.

10. The method of claim 9, wherein:

judging whether to allocate the redundant video data bandwidth for transmitting the redundant video data according to the current packet loss ratio of the video data comprises: comparing the current packet loss ratio of the video data with a preset threshold; if the current packet loss ratio of the video data is greater than the threshold, allocating the redundant video data bandwidth for transmitting the redundant video data; and judging whether to allocate the redundant audio data bandwidth for transmitting the redundant audio data according to the current packet loss ratio of the audio data comprises: comparing the current packet loss ratio of the audio data with a preset threshold; if the current packet loss ratio of the audio data is greater than the threshold, allocating the redundant audio data bandwidth for transmitting the redundant audio data.

11. The method of claim 8, wherein:

the obtained current packet loss ratio of the video data is one packet loss ratio of the video data or a comprehensive value of multiple packet loss ratios of the video data, or a packet loss ratio of the video data within a certain period of time; and the obtained current packet loss ratio of the audio data is one packet loss ratio of the audio data or a comprehensive value of multiple packet loss ratios of the audio data, or a packet loss ratio of the audio data within a certain period of time.

12. The method of claim 8, wherein:

allocating the redundant video data bandwidth according to the obtained current packet loss ratio of the video data comprises: presetting a fixed bandwidth; after obtaining the current packet loss ratio of the video data, using the preset fixed bandwidth as the redundant video data bandwidth; and allocating the redundant audio data bandwidth according to the obtained current packet loss ratio of the audio data and the target total audio data bandwidth comprises: presetting a fixed bandwidth; after obtaining the current packet loss ratio of the audio data, using the preset fixed bandwidth as the redundant audio data bandwidth, wherein the target total audio data bandwidth is greater than the redundant audio data bandwidth.

13. The method of claim 8, wherein:

allocating the redundant video data bandwidth according to the obtained current packet loss ratio of the video data comprises: presetting a mapping table between the packet loss ratio of the video data and the redundant video data bandwidth; after obtaining the current packet loss ratio of the video data, querying the mapping table, and obtaining the redundant video data bandwidth corresponding to the current packet loss ratio of the video data; and allocating the redundant audio data bandwidth according to the obtained current packet loss ratio of the audio data and the target total audio data bandwidth comprises: presetting a mapping table between the packet loss ratio of the audio data and the redundant audio data bandwidth; after obtaining the current packet loss ratio of the audio data, querying the mapping table, and obtaining the redundant audio data bandwidth corresponding to the current packet loss ratio of the audio data, wherein the target total audio data bandwidth is greater than the redundant audio data bandwidth.

14. The method of claim 8, wherein:

allocating the redundant video data bandwidth according to the obtained current packet loss ratio of the video data comprises: designing a formula to associate the redundant video data bandwidth with the packet loss ratio of the video data, and calculating the redundant video data bandwidth according to the packet loss ratio of the video data; and allocating the redundant audio data bandwidth according to the obtained current packet loss ratio of the audio data and the target total audio data bandwidth comprises: designing a formula to associate the redundant audio data bandwidth with the packet loss ratio of the audio data, and calculating the redundant audio data bandwidth according to the packet loss ratio of the audio data, wherein the target total audio data bandwidth is greater than the redundant audio data bandwidth.

15. A video communication device, comprising a data transceiver module, and further comprising:

a bandwidth allocating module, configured to: obtain packet loss ratios of audio data and video data, and allocate redundant data bandwidths to the audio data and video data according to the obtained packet loss ratios of the audio data and video data;

an audio data error resilience module, configured to: generate redundant audio data for error resilience according to the redundant audio data bandwidth allocated by the bandwidth allocating module, and send the audio data and redundant audio data to the data transceiver module; and a video data error resilience module, configured to: generate redundant video data according to the redundant video data bandwidth allocated by the bandwidth allocating module, and send the video data and redundant video data to the data transceiver module.

16. The device of claim 15, further comprising a judging module, wherein:

the judging module is configured to: compare the audio packet loss ratio obtained by the bandwidth allocating module with a preset threshold; if the audio packet loss ratio is greater than a preset threshold, notify the bandwidth allocating module of allocating the redundant audio data bandwidth; or the judging module is configured to: compare the video packet loss ratio obtained by the bandwidth allocating module with a preset threshold; if the video packet loss ratio is greater than a preset threshold, notify the bandwidth allocating module of allocating the redundant video data bandwidth.

17. The device of claim 15, further comprising a bandwidth calculating module, wherein:

the bandwidth calculating module is configured to: calculate the redundant audio data bandwidth according to the packet loss ratio of the audio data obtained by the bandwidth allocating module or according to the current packet loss ratio of the audio data, a video communication bandwidth, an encoded audio data bandwidth, and an encoded video data bandwidth, and send the redundant audio data bandwidth to the bandwidth allocating module; calculate a target total video data bandwidth according to the redundant audio data bandwidth, video communication bandwidth, encoded audio data bandwidth, and encoded video data bandwidth, calculate the redundant video data bandwidth according to the packet loss ratio of the video data obtained by the bandwidth allocating module or according to the current packet loss ratio of the video data, video communication bandwidth, encoded audio data bandwidth, and encoded video data bandwidth, and send the redundant video data bandwidth to the bandwidth allocating module, wherein the target total video data bandwidth is greater than the redundant video data bandwidth; or the bandwidth calculating module is configured to: calculate the redundant video data bandwidth according to the packet loss ratio of the video data obtained by the bandwidth allocating module or according to the current packet loss ratio of the video data, video communication bandwidth, encoded audio data bandwidth, and encoded video data bandwidth, and send the redundant video data bandwidth to the bandwidth allocating module; calculate a target total audio data bandwidth according to the redundant video data bandwidth, video communication bandwidth, encoded audio data bandwidth, and encoded video data bandwidth, calculate the redundant audio data bandwidth according to the packet loss ratio of the audio data obtained by the bandwidth allocating module or according to the current packet loss ratio of the audio data, video communication bandwidth, encoded audio data bandwidth, and encoded video data bandwidth, and send the redundant audio data bandwidth to the bandwidth allocating module, wherein the target total audio data bandwidth is greater than the redundant audio data bandwidth.

\* \* \* \* \*